(12) United States Patent
Batcher et al.

(10) Patent No.: US 7,995,753 B2
(45) Date of Patent: Aug. 9, 2011

(54) PARALLEL CIPHER OPERATIONS USING A SINGLE DATA PASS

(75) Inventors: Kenneth W. Batcher, Hudson, OH (US); Rodney Haven, Wooster, OH (US)

(73) Assignee: Cisco Technology, Inc., San Jose, CA (US)

( * ) Notice: Subject to any disclaimer, the term of this patent is extended or adjusted under 35 U.S.C. 154(b) by 1355 days.

(21) Appl. No.: 11/214,298

(22) Filed: Aug. 29, 2005

(65) Prior Publication Data
US 2007/0064934 A1 Mar. 22, 2007

(51) Int. Cl.
*H04L 9/00* (2006.01)
(52) U.S. Cl. ............ 380/44; 380/28; 380/255; 380/277; 713/161; 713/168; 713/171; 713/189; 726/4; 726/26
(58) Field of Classification Search .................. 713/1, 2, 713/188, 194, 161, 168, 171, 189; 380/200, 380/201, 255, 277, 44, 28; 726/2, 4, 26
See application file for complete search history.

(56) References Cited

U.S. PATENT DOCUMENTS

| 5,341,427 | A | * | 8/1994 | Hardy et al. | |
| 5,754,563 | A | * | 5/1998 | White | |
| 5,892,900 | A | * | 4/1999 | Ginter et al. | |
| 6,363,148 | B1 | * | 3/2002 | Sako | 380/28 |
| 6,442,690 | B1 | * | 8/2002 | Howard, Jr. et al. | |
| 6,694,473 | B1 | * | 2/2004 | Su et al. | |
| 6,971,006 | B2 | * | 11/2005 | Krishna et al. | |
| 6,973,187 | B2 | * | 12/2005 | Gligor et al. | |
| 7,313,234 | B2 | * | 12/2007 | Takagaki et al. | 380/28 |
| 7,428,639 | B2 | * | 9/2008 | Demos | |
| 2003/0074473 | A1 | * | 4/2003 | Pham et al. | |
| 2004/0157584 | A1 | * | 8/2004 | Bensimon et al. | |
| 2006/0056623 | A1 | * | 3/2006 | Gligor et al. | |
| 2006/0091219 | A1 | * | 5/2006 | Joseph et al. | 235/462.25 |
| 2007/0223688 | A1 | * | 9/2007 | Le Quere | |
| 2008/0271159 | A1 | * | 10/2008 | Brown et al. | |

* cited by examiner

*Primary Examiner* — Saleh Najjar
*Assistant Examiner* — Joseph Pan
(74) *Attorney, Agent, or Firm* — Tucker Ellis & West LLP (57) ABSTRACT

Multiple cipher hardware algorithms are run in parallel over an input stream. For example, one algorithm can process the input stream using an old cipher key while a parallel algorithm processes the input stream using the current cipher key. Alternatively, multiple cipher operations can be performed in parallel enabling a receiver to determine which cipher algorithm was employed in encrypting a data packet.

26 Claims, 4 Drawing Sheets

PARALLEL CIPHER OPERATIONS USING A SINGLE DATA PASS

BACKGROUND OF THE INVENTION

The present invention generally relates to a system and method for increasing the efficiency of a system by running parallel algorithms or cipher operations. More particularly, this inventions relates to a system for passing incoming frame data to two or more algorithms, cipher or message integrity check operations in parallel and determining which one is the correct result.

Modern wireless networks (WLANs) require robust and flexible security. Three aspects of current WLANs make it particularly difficult to implement quality security as compared to the equivalent wired local area network (LAN). First, the WLANs are open in nature with transmission through the air and therefore lack the same physical barriers found in LANs. Second, WLAN end user units are mobile and roam from access point (AP) to AP so crypto keys, encryption parameters and encryption state must be timely updated. Third, a central processing unit (CPU) must often be used to determine the crypto and authentication algorithms to be run before any crypto operation can begin.

Figure 1:
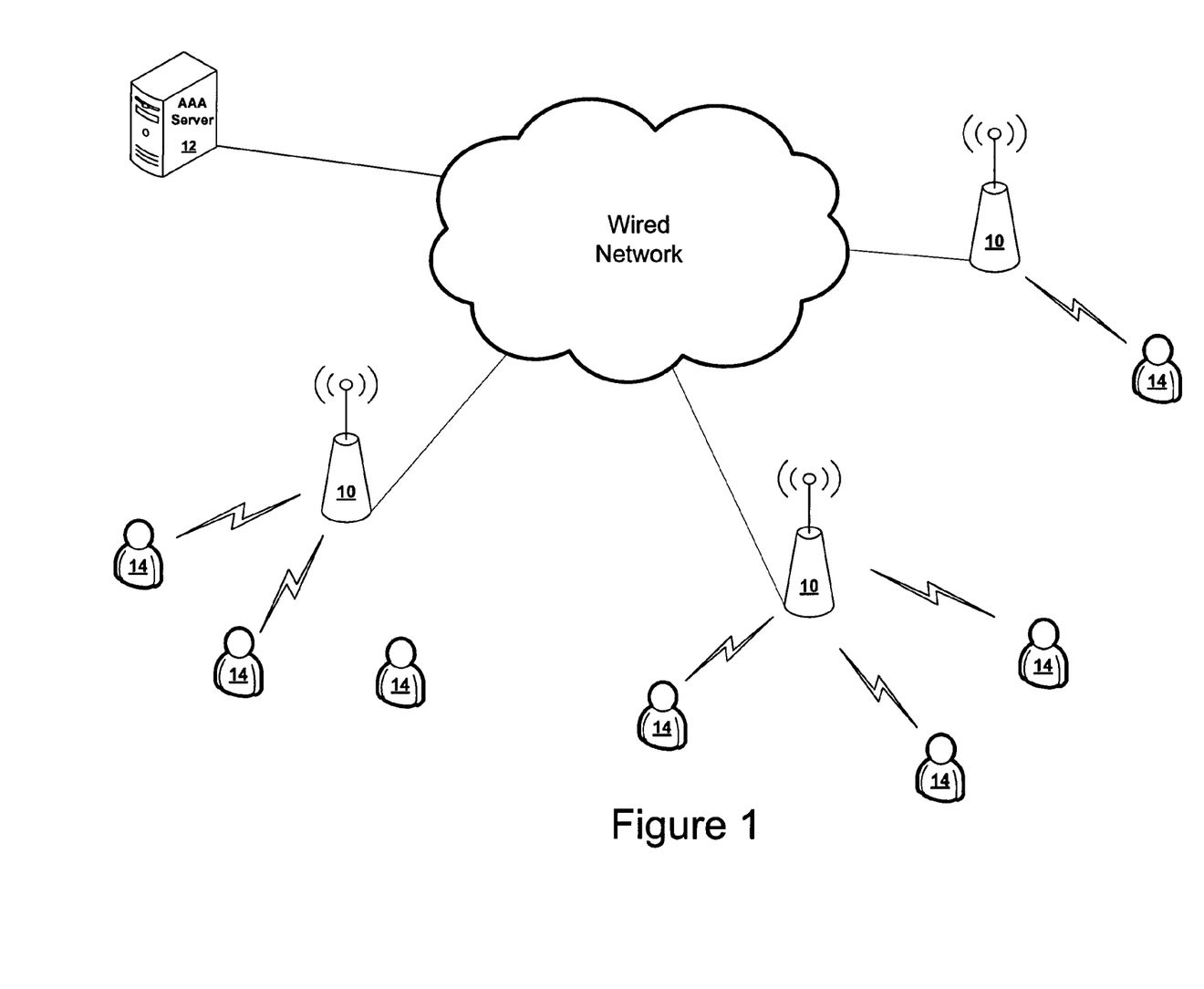
FIG. 1 is a diagram of a simple network that shows some of the components involved in operating a wireless network.

Because WLANs lack the same physical barriers as in wire LANs, intruder detection is more difficult. To help defend a WLAN from intrusion, a form of authentication is used to be sure the client requesting use of the LAN is an authorized user. In the 802.11 WLAN environment, the IEEE specification 802.11i uses a message integrity check (MIC) with a key. The IEEE 802.11i standard requires the keys to be periodically changed. Referring to FIG. 1, the key update typically starts when an AP 10 request an updated key from the authentication, authorization, and accounting (AAA) server 12. Ideally, the new key will be used in place of the old key from as soon as the AAA server creates the new key. However, because one AP may service many roaming clients 14, they are not all updated with the new key at the same time. Also, the AP needs to update its own packets for transmission and this takes some time.

Figure 2:
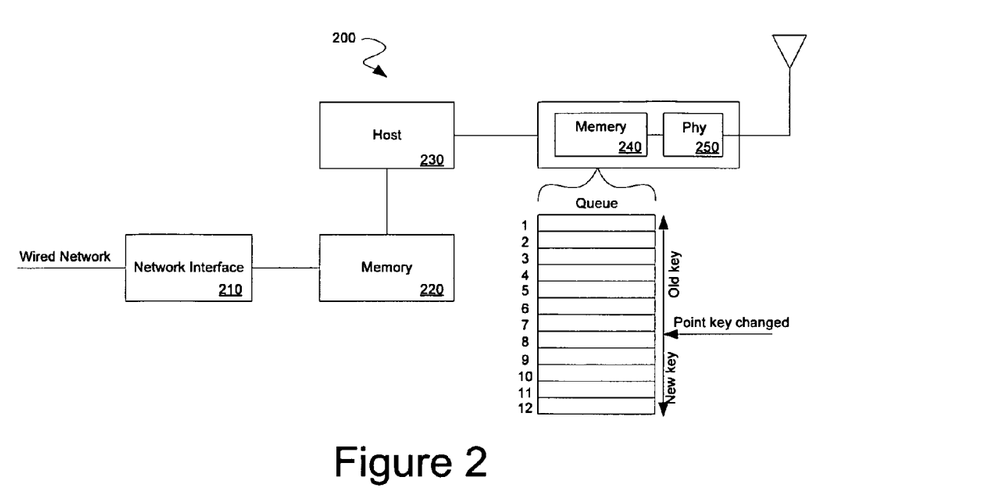
FIG. 2, shows a block diagram of how old and new keys might both be valid for a short time in a wireless system.

FIG. 2 is a hardware block diagram that depicts more precisely how both old and new keys can still be valid in a wireless system 200. Frames enter the wireless network from the wired network through a network interface 210. Usually they are buffered into a memory 220 until a host processor 230 has time to process them and figure out what security algorithms and keys are needed for each packets encryption, decryption, or MIC authentication. The host processor 230 will often need to look up a particular packet's key, and cryptography settings in another table in order to know how to process a particular packet. However, once the packet is waiting in the queue, the AAA server may change the key value (or other security values) resulting in an old key and a new key. Once the host processor 230 detects the security algorithm change or key change, it begins to use the new algorithm or key. The result is that the memory 240 queue ends up with some frames ready to transmit with the old key and some keys ready to transmit with a the new key.

Adding MIC checks to the packet frames is currently done in software running on the AP host CPU. The host then sends the frames with the added MIC down to the radio where they are later queued for transmission. Once queued, it is too late to change the frames on the radio, so they will be sent with the MIC calculated with the old key. The situation is symmetrical on frames received by the AP from the clients. The clients will also have frames queued with MICs calculated with old keys until it has had time to updated the start using the new key. Therefore, the AP will continue to get frames that were authenticated with the old key for some period of time after a key update.

From a security perspective, there is no real problem since it is a natural affect of the asynchronous nature of the key update. It is still safe to send transmit (TX) and receive (RX) frame using the old key for a short period of time without compromising the WLAN.

The asynchronous update of the keys reduces the quality of service (QOS). Past attempts to solve this problem address how the key is updated but fail to account for the reduction in QOS. The frames failing the MIC check may be completely dropped. The frames can be resent later after the receiver sends a NACK or other alternative indication that the frame was invalid. Alternatively, the MIC check can be performed first with the new key and if that fails the MIC check then the check can be performed with the old key but this requires double the valuable CPU time because the frame and key both need reloaded and then the entire calculation must be recalculated with the new key. In both of these solutions QOS suffers because dropping frames or spending more time than needed running frames through a double MIC check with each key creates latency as to when the frames finally are ready to be processed after authentication. This additional latency can cause adverse user affects when the frames are used in QOS intense applications such as streaming video or voice over IP (VoIP) audio.

The exact security algorithm implemented in a frame can depend on a client address, quality of service (QOS) specification for that client, and the security association. Additionally, different basic service set identifiers (BSSIDs) often require different security protocols for groups of nodes in the same BSSID. Resolving this information to determine which security algorithms to use takes some time and creates setup lag. The setup lag may even contribute to a dropped packet or memory bottleneck if the input arrival rate is fast and the CPU cannot select and set up the proper security algorithm in time for an RX overrun.

This invention solves the problem increased latency because of key updates and determining the correct security algorithm as well as other problems encountered in the prior art. This invention provides a system and method to increase system throughput when computing MIC and other cipher operations.

SUMMARY OF THE INVENTION

The present invention solves the problem of increased latency because of key updates and determining the correct security algorithm as well as other problems encountered in the prior art. An aspect of the present invention provides a system and method to increase system throughput when computing MIC and other cipher operations.

The present invention, in accord with an aspect described and disclosed herein, is directed to a system for performing a plurality of cipher operations on an input data stream in parallel. The apparatus may employ one or more memories and/or use two or more algorithms to simultaneously operate on the same data. Alternatively, there may be two or more different keys with each algorithm using a different key when computing their values. A validator (validation logic) may be used to determine if any of the algorithms produces a correct result and that result may be switched for further use.

In accordance with an aspect of the present inventions, there is disclosed herein a method for performing multiple cipher algorithms concurrently. The method comprises receiving an input data stream to one or more memories and/or for using two or more algorithms to calculate values while simultaneously operating on the same data in the memory or memories. The method may use two or more different keys with each algorithm using a different key when computing values. The method validates the results of the aforementioned algorithms to determine which, if any, of the algorithms produces a correct result. The method may further employ switching to select the correct result.

In accordance with an aspect of the present inventions, there is disclosed herein an apparatus for performing multiple cipher operations in parallel. The method comprises means for receiving an input data stream to one or more memories and a means for using two or more algorithms to calculate values while simultaneously operating on the same data in the memory or memories.

The aforementioned algorithms may comprise any cipher operations, including but not limited to advanced encryption standard (AES), data encryptions standard (DES), triple DES (DES3) and wireless equivalent privacy (WEP) or may be MIC operations such as Michael temporal key integrity protocol (Michael TKIP), multilinear modular hash with Cisco key integrity protocol (MMH CKIP), wired equivalent privacy (WEP RC4) and cipher block chaining MAC (CBC-MAC). Alternatively, two or more different keys can be used, wherein the same algorithm uses different keys when computing values in parallel.

DETAILED DESCRIPTION OF THE INVENTION

An aspect of the present invention provides a fast and efficient means of performing multiple cipher operations in parallel over a single pass of input data. An aspect of the present invention is that it reduces the need to drop frames when failing a MIC check in a wireless local area network (WLAN). An aspect of the present invention also provides a faster and more efficient means of running MIC checks by using old and new keys concurrently, and performing these checks concurrently and reading the data stream once. An aspect of the present invention is that it helps facilitate quick CPU setup of cipher operations since all possible candidate algorithms and/or keys can be run at the same time.

Figure 3:
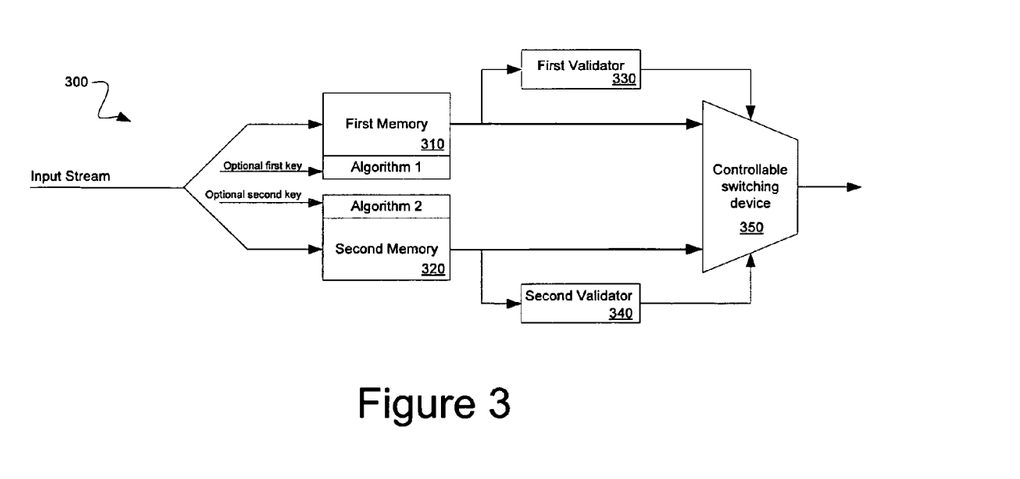
FIG. 3 is a hardware block diagram of a system according to the present invention that is implemented with two memories operated on by two algorithms.

FIG. 3 is a block diagram that depicts an exemplary parallel cipher operation system 300. This implementation uses two memory structures 310, 320 to receive data from an input stream. This is the example of one implementation of hardware may used be to improve the time it takes to process multiple algorithms such a cipher operations or a MIC operations concurrently in and then determining which one is correct.

In FIG. 3 the same input data stream is input to a first memory 310 and a second memory 320 at the same time. Memories 310, 320 can be in any form including digital registers, buffers, FIFOs, etc. The data can be in the form of wireless packet or frame data or any other useful format. Once the data begin to enter memory 310, 320 a variety of cryptograph, message integrity, algorithms with keys or any other useful algorithms can operate on the data and return it to the same memory locations. The algorithms (algorithm 1 and algorithm 2) are preferably implemented in logic. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

The algorithms for the first memory 310 and the second memory 320 can be different but can be the same. For example, Algorithm 1 in first memory 310 and Algorithm 2 in second memory 320 can be the same algorithm, but one can be using a current key while the other uses an old key, usually the most recent expired key. To ensure further security, the old key can be set to expire after a predetermined time. Once the predetermined time has elapsed, the old key can be set to equal the new key. Alternatively, Algorithm 1 and Algorithm 2 can perform totally different cipher algorithms. As noted hereinabove, the aforementioned algorithms may comprise any cipher operations, including but not limited to advanced encryption standard (AES), data encryptions standard (DES), triple DES (DES3) and wireless equivalent privacy (WEP) or may be MIC operations such as Michael temporal key integrity protocol (Michael TKIP), multilinear modular hash with Cisco key integrity protocol (MMH CKIP), wired equivalent privacy (WEP RC4) and cipher block chaining MAC (CBC-MAC).

Once the algorithms are completed the results are checked to ascertain which if any algorithm produced a valid result. Validation logic (Validator), e.g, first validator 330 and second validator 340 will check their respective memory 310, 320 data to determine if their corresponding algorithm produced a correct result. As illustrated in FIG. 3 first validator 330 and second validator 340 are shown as separate components from first memory 310 and second memory 320; however, those skilled in the art can readily appreciate that as validators are comprised of logic, they can be coupled to first memories 310, 320 by any means, including being a part of Algorithm 1 and Algorithm 2. If one produced a correct result, the validators will signal controllable switching device 350, which will switch the correct result to an output. The controllable switching device 350 can be any suitable switching device such as a multiplexer, or can also be implemented in logic.

Figure 4:
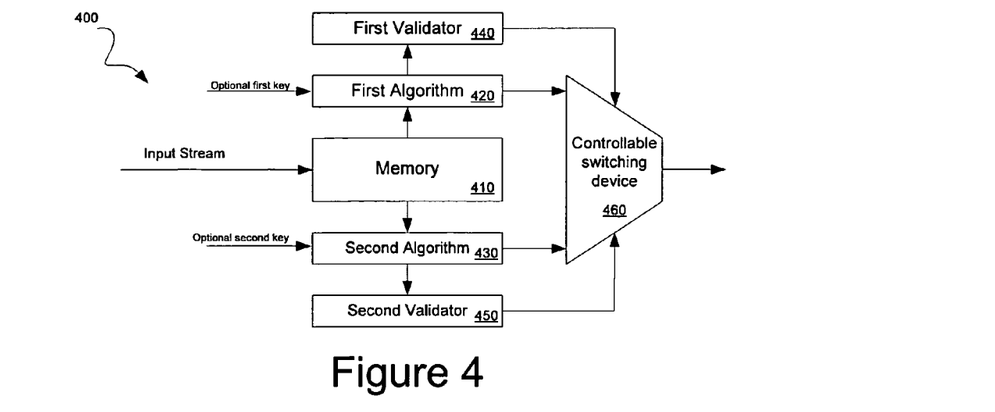
FIG. 4 is a hardware block diagram of a system according to the present invention that is implemented with one memories operated on by two algorithms.

FIG. 4 is a block diagram of an alternative implementation of a parallel cipher system 400. In FIG. 4 the input data stream is input to a single memory 410. The memory can be in any form including digital registers. The data can be in the form of wireless packet or frame data or any other useful format. Once the data enters memory 410, logic for performing a variety of cryptograph, message integrity, algorithms with keys or any other useful algorithms operate on the data. In one embodiment, once an algorithm obtains a valid result, the valid result can be inserted into memory 410, in which case controllable switching device 450 could be eliminated. In another embodiment, a memory local to the algorithms 420, 430 can be used to store the result for the corresponding algorithm.

The logic for performing the first algorithm 420 and the second algorithm 430 can perform the same cipher operation using different keys (e.g., a recently expired key and the current key), or can perform completely different algorithms. In embodiments with more than two memories (see for example FIG. 5), several different algorithms can be implemented in parallel, with each algorithm also implementing in parallel a cipher operation using the current key and a recently expired key. As noted hereinabove, the aforementioned algorithms may comprise any cipher operations, including but not limited to advanced encryption standard (AES), data encryptions standard (DES), triple DES (DES3) and wireless equivalent privacy (WEP) or may be MIC operations such as Michael temporal key integrity protocol (Michael TKIP), multilinear modular hash with Cisco key integrity protocol (MMH CKIP), wired equivalent privacy (WEP RC4) and cipher block chaining MAC (CBCMAC).

After algorithms 420, 430 are completed, logic for validating the results of the algorithms, first validator 440 and the second validator 450, will check their respective algorithm data to determine if any algorithm 420, 430 produced a correct result. If an algorithm 420, 430 produced a correct result, the validator 440,450 that found a valid result will signal to the controllable switching device 460 to switch the correct result to an output. The controllable switching device 460 can implemented in logic or be any suitable switching device such as multiplexer.

Additionally, when different key values such as old and new keys are both checked to see if any will produce a correct result, then each of the old key may be input the each of the algorithms operating on the first algorithm 420 and the second algorithm 430.

Figure 5:
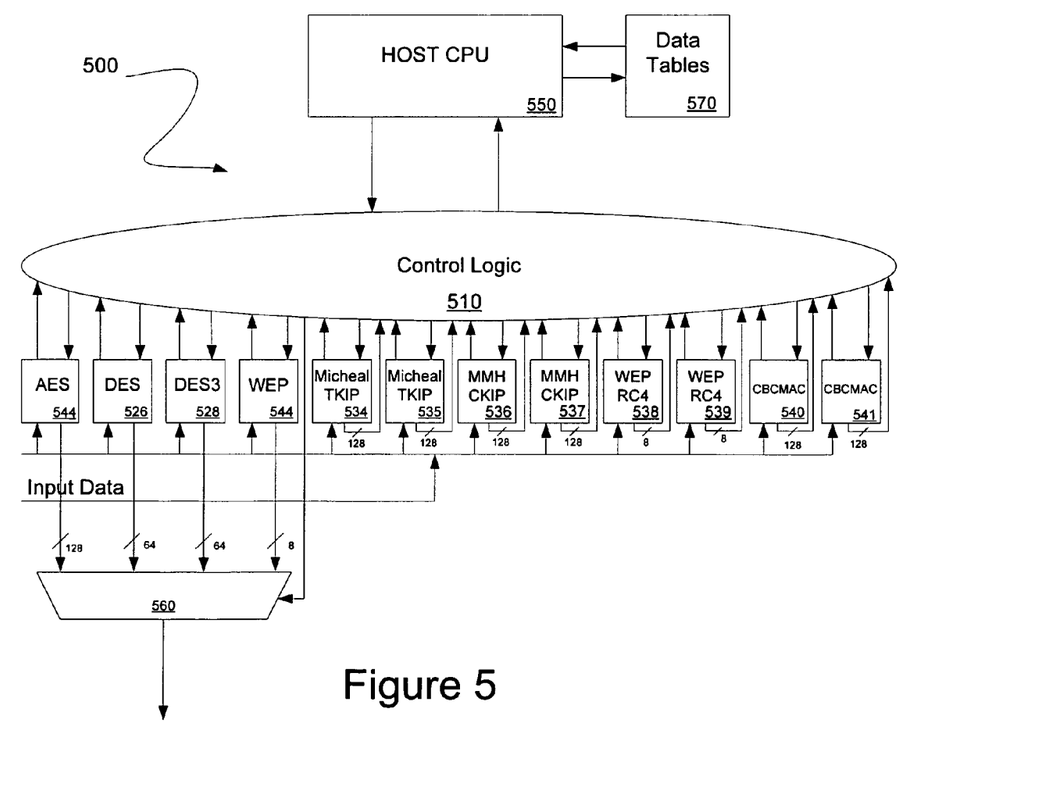
FIG. 5 is a hardware block diagram of a system according to the present invention that is implemented with a controller.

FIG. 5 is a block diagram of a system 500 in accordance with an aspect of the present invention. This system 500 is suitably adaptable to be used inside an AP to improve the time it takes to process a frame when old and new keys might still be used concurrently in a network or when the final cipher operation must be resolved by a CPU. Blocks that represent MIC operations are Michael temporal key integrity protocol (Michael TKIP) 534-535, MMH CKIP 536-537, wired equivalent privacy (WEP RC4) 538-539 and cipher block chaining MAC (CBCMAC) 540-541. Blocks that represent encryption (or decryption) algorithms are advanced encryption standard (AES) 524, data encryptions standard (DES) 526, DES3 528 and WEP 544.

Whenever key updating occurs, the old key might still be in use with clients that are communicating with the AP, so the control logic 510 can signal for the CBCMAC block 540 to perform the MIC calculations with the new key and for the other CBCMAC block 542 to perform MIC calculation with the old key. When the MIC is completed to control block 510 can then check both CBCMAC outputs to see if either MIC or none of the MICs correctly authenticate the packet.

If more than one MIC algorithm might be used, such as Michael TKIP 534-535, MMH CKIP 536-537 or WEP RC4 538-539 then pairs of these blocks could be added in parallel to the CBCMAC blocks 540-541. Each MIC algorithm can now be run for any possible MIC algorithm with both the old and new key values. Once the CPU 550 and control logic 510 determines the proper MIC algorithm, then the version of this algorithm calculated with the new and old keys can quickly be checked to see if the packet was authenticated.

Because the AAA server may invalidate an old key or change a cipher algorithm, there will be periods when packets maybe encrypted with either the old or new key or packets that have been operated on by the old or new cipher algorithm. The reason for this was explained in FIG. 2 because the key and algorithm updates initiated by the AAA server take some time to propagate to all APs and the entire network. Usually a AAA server will change an algorithm causing a data table 570 to be updated. The host CPU 550 will have to search specific location in that table depending on what type of pack it is ready to process. This all takes time, so to speed up the process when the host CPU 550 needs does not know immediately what the algorithm needs to be used, then any possible cipher operation will be performed in parallel. Once the host 550 resolves the proper algorithm needed, the correct cipher outputs can later be selected by the controller 510 and causing controllable switching device 560 to select the appropriate source.

To further reduce the delay in cipher operations that result from the time it takes to resolve which cipher operation is to be preformed, the controller 510 can begin to set up several different cipher operations as soon as a stream of frame data is (or a portion thereof) available. The data can begin to be loaded in to the cipher blocks such as AES 524, DES 526, DES3 528 and WEP 544 and those blocks can begin calculating the ciphers text as soon as the controller 510 has loaded enough data into them. Later when the host CPU 550 has finally looked at frame header data (and can for example reference an external data base with the incoming address to obtain cipher information) and finally figured out the correct cipher operation to be performed on the data, the host CPU 550 and controller 510 can signal the switching device 260 and just the correct cipher result will be result used. Those skilled in the art can readily appreciate that the correct cipher result may be determined before the entire packet is received.

Because the different MIC algorithms and the different cipher operation can have different input data needs and can take different amounts of clock cycles to complete, the controller 510 will need to signal the cipher and MIC algorithm blocks when to load data, know when each block is in the process of calculating a result, be aware of when each block responds that it has completed the required calculation and assist in sending the required amount of data to be output for transmission (or reception).

Figure 6:
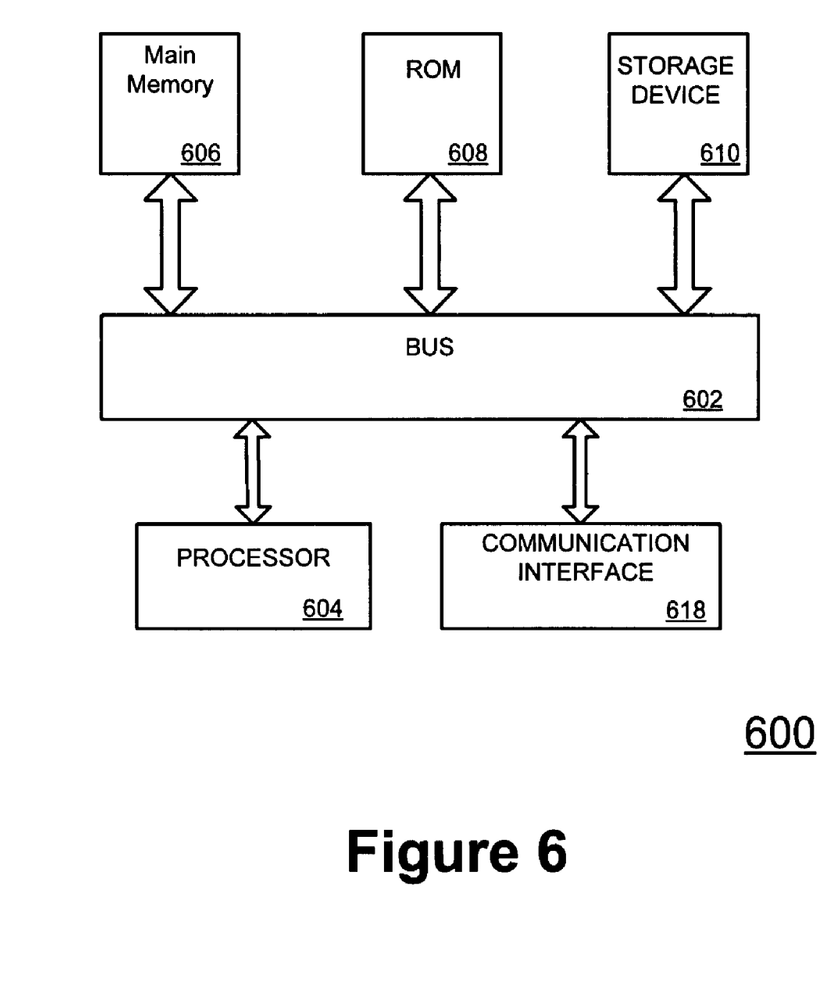
FIG. 6 is a block diagram that illustrates a computer system upon which an embodiment of the invention may be implemented.

FIG. 6 is a block diagram that illustrates a computer system 600 upon which an embodiment of the invention may be implemented. For example, computer system 600 can be used to implement an algorithm such as Algorithm 1 and Algorithm 2 first validator, second validator and/or controllable switching device as described in FIGS. 3 and 4, or the control logic as shown in FIG. 5.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

The invention is related to the use of computer system 600 for parallel cipher operations. According to one embodiment of the invention, parallel cipher operations are provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to non-volatile media, volatile media, and transmission media. Non-volatile media include for example optical or magnetic disks, such as storage device 610. Volatile media include dynamic memory such as main memory 606. Transmission media include coaxial cables, copper wire and fiber optics, including the wires that comprise bus 602. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over any suitable medium (e.g., RF, Optical, IR, or any wired or wireless network) to communication interface 118 which enables communications to devices external to computer system 600.

Communication interface 618 provides a two-way data communication between computer system 600 and an external device. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

The received code may be executed by processor 604 as it is received, and/or stored in storage device 610, or other non-volatile storage for later execution. In this manner, computer system 600 may obtain application code in the form of a carrier wave.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

What is claimed is:

1. An apparatus for performing parallel operations, the apparatus comprising:
   a first memory for receiving an input stream;
   a first algorithm operating on the input stream using a first key to produce a first result and operating in parallel on the same input stream using a second key different than the first key to produce a second result;
   a second algorithm operating in parallel with the first algorithm on the same input stream using the first key to produce a third result different than the first result and operating on the same input stream in parallel using the second key to produce a fourth result different than the second result;
   a first validator coupled with the memory and configured for determining whether a one of the first or second result is valid;
   a second validator coupled with the memory and configured for determining whether a one of the third or fourth result is valid; and,
   a control device operatively coupled with the first and second validators, the control device being configured for selecting, based on signals received from the first and second validators, either the first algorithm and switching the determined valid one of the first or second results to an output of the control device or the second algorithm and switching the determined valid one of the third or fourth results to the output of the control device.

2. The apparatus according to claim 1, wherein the first and second algorithms are cipher algorithms, and the first cipher algorithm is configured to operate on the input stream using the first and second keys and the second cipher algorithm is configured to operate on the input stream using the first and second keys.

3. The apparatus according to claim 2, wherein the first key is a current key and the second key is a previously expired version of the current key.

4. The apparatus according to claim 3, wherein the second key expired less than a predetermined time.

5. The apparatus according to claim 4, wherein the second key is set to be equal to the first key after the predetermined time has expired.

6. The apparatus according to claim 1, wherein the first and second algorithms are different cipher decryption algorithms.

7. The apparatus according to claim 1, wherein the first and second algorithms are message integrity check algorithms.

8. The apparatus according to claim 1, further comprising:
   a second memory for receiving the input stream;
   wherein the second algorithm and second validator are coupled with the second memory and the second algorithm is configured to operate on the input stream received by the second memory in parallel with the first algorithm, the second algorithm producing the third and fourth results.

9. An apparatus according to claim 8, wherein the first algorithm is one of the group consisting of: advanced encryption standard (AES), data encryptions standard (DES), triple DES (DES3), wireless equivalent privacy (WEP), Michael temporal key integrity protocol (Michael TKIP), multilinear modular hash with Cisco key integrity protocol (MMH CKIP), wired equivalent privacy (WEP RC4) and cipher block chaining MAC (CBCMAC) and the second algorithm is another one of the group consisting of advanced encryption standard (AES), data encryptions standard (DES), triple DES (DES3), wireless equivalent privacy (WEP), Michael temporal key integrity protocol (Michael TKIP), multilinear modular hash with Cisco key integrity protocol (MMH CKIP), wired equivalent privacy (WEP RC4) and cipher block chaining MAC (CBCMAC).

10. An apparatus for performing parallel operations, the apparatus comprising:
a first memory means adapted for receiving an input stream;
a first algorithm means configured to operate on the input stream using a first key for producing a first result, and being configured to operate in parallel on the same input stream using a second key different than the first key for producing a second result;
a second algorithm means operating in parallel with the first algorithm means and being configured to operate on the same input stream using the first key for producing a third result different than the first result, and being configured to operate on the same input stream in parallel using the second key to produce a fourth result different than the second result;
a first validation means operable to receive the first and second results and determine whether a one of the first or second result is valid;
a second validation means operable to receive the third and fourth results and determine whether a one of the third or fourth result is valid; and,
a selection means operatively coupled with the first validation means and second validation means and operable to select, based on signals received from the first and second validation means, either the first algorithm means or the second algorithm means and switching the determined one of the first result, the second result, the third result or the fourth result to an output of the selection means.

11. The apparatus according to claim 10, wherein:
the first algorithm means and the second algorithm means are equivalent cipher algorithms; and
the first key is a current key and the second key is a previously expired version of the current key that expired less than a predetermined time.

12. The apparatus according to claim 11, wherein the second key is set to be equal to the first key after the predetermined time has expired.

13. The apparatus according to claim 12, wherein the first algorithm means and the second algorithms means perform different cipher decryption algorithms.

14. The apparatus according to claim 12, wherein the first and second algorithms are message integrity check algorithms.

15. The apparatus according to claim 12, further comprising:
a second memory means adapted for receiving the same input stream;
wherein the second algorithm means is configured to operate on the same input stream received by the second memory means in parallel with the first algorithm means, the second algorithm means producing the third and fourth results.

16. An apparatus according to claim 15, wherein the first algorithm means is one of the group consisting of advanced encryption standard (AES), data encryptions standard (DES), triple DES (DES3), wireless equivalent privacy (WEP), Michael temporal key integrity protocol (Michael TKIP), multilinear modular hash with Cisco key integrity protocol (MMH CKIP), wired equivalent privacy (WEP RC4) and cipher block chaining MAC (CBCMAC) and the second algorithm means is another one of the group consisting of advanced encryption standard (AES), data encryptions standard (DES), triple DES (DES3), wireless equivalent privacy (WEP), Michael temporal key integrity protocol (Michael TKIP), multilinear modular hash with Cisco key integrity protocol (MMH CKIP), wired equivalent privacy (WEP RC4) and cipher block chaining MAC (CBCMAC).

17. A method in a computer system comprising logic and a non-transitory memory for performing cipher operations on an input stream to generate an output stream, the method comprising:
receiving an input stream into the non-transitory memory of the computer system;
applying, in parallel, a first cipher algorithm to the input stream using first and second keys to produce a first result set;
applying, in parallel, a second cipher algorithm to the same data of the same input stream concurrently with the applying of the first algorithm using the first and second keys to selectively produce a second result set different than the first result set;
determining by the logic which one of the first result set and second result set is valid;
selecting by the logic the correct cipher result based on which one of the first result set and second result set that was determined to be valid; and,
switching the selected correct cipher result to an output as an output stream.

18. A method according to claim 17, wherein:
the first algorithm and second algorithm are equivalent;
the first algorithm is configured to operate on the input stream using a first key and the second algorithm is configured to operate on the input stream using a second key; and
wherein the first key is a current key and the second key is a previously expired version of the current key that expired less than a predetermined time.

19. A method according to claim 18, further comprising setting the second key equal to the first key after the predetermined time has expired.

20. A method according to claim 17, wherein the first and second algorithms are message integrity check algorithms.

21. A method according to claim 17, wherein the first algorithm and second algorithms perform different cipher decryption algorithms.

22. A method according to claim 21, further comprising:
storing the first result set in a first memory; and
storing the second result set in a second memory.

23. The apparatus according to claim 1, wherein:
the first and second algorithms are configured to operate simultaneously on the input stream.

24. The apparatus according to claim 10, wherein:
the first and second algorithm means are configured to operate simultaneously on the input stream.

25. The apparatus according to claim 1, wherein:
the first validator is configured for determining whether a one of the first or second result is invalid;
the second validator is configured for determining whether a one of the third or fourth result is invalid;
the control device is configured for selecting either the first algorithm or the second algorithm responsive to determining which one of the first, second, third, or fourth results is valid based on others of the first, second, third, or fourth results being determined by the first and second validators to be invalid.

26. The apparatus according to claim 10, wherein:
the first validation means is operable to receive the first and second results and determine whether a one of the first or second result is invalid;
the second validation means is operable to receive the third and fourth results and determine whether a one of the third or fourth result is invalid;
the selection means is operable to select either the first algorithm means or the second algorithm means responsive to determining which one of the first result, the second result, the third result or the fourth result is valid based on others of the first result, the second result, the third result or the fourth result being determined by the first and second validation means to be invalid.

* * * * *